4/26/88 XR 4,740,269

United States Patent [19]

Berger et al.

[11] Patent Number: 4,740,269

[45] Date of Patent: Apr. 26, 1988

[54] PROCESS AND APPARATUS FOR APPLYING AUTHENTICATING CODING TO VALUE-CARRYING PAPER

[75] Inventors: Erich Berger, Vienna, Austria; Hans Langer, Gräfelfing, Fed. Rep. of Germany

[73] Assignee: Oesterreichische Nationalbank, Vienna, Austria

[21] Appl. No.: 917,987

[22] Filed: Oct. 10, 1986

[30] Foreign Application Priority Data

Oct. 11, 1985 [AT] Austria ................................ 2947/85

[51] Int. Cl.[4] ........................ B44C 1/22; C03C 15/00; C03C 25/06

[52] U.S. Cl. .................................... 156/643; 156/654; 156/345; 219/121 LJ; 219/121 LW; 219/121 LM; 427/53.1; 427/228; 427/308; 427/326

[58] Field of Search ....................... 156/643, 654, 345; 219/121 LH:121 LJ, 121 LM, 121 L, 121 LW; 427/53.1, 228, 308, 326; 118/620, 624, 627, 629, 659, 641

[56] References Cited

U.S. PATENT DOCUMENTS 3,396,401 8/1968 Nonomura .................. 219/121 LM 4,507,346 3/1985 Maurer et al. ................ 427/53.1 X

FOREIGN PATENT DOCUMENTS 2907004 8/1980 Fed. Rep. of Germany .

1128616 9/1968 United Kingdom .

2044175 10/1980 United Kingdom .

2126955 4/1984 United Kingdom .

2161752 1/1986 United Kingdom .

OTHER PUBLICATIONS

Harris et al., "Thermal Printer", IBM Tech. Disc. Bulletin, vol. 15, No. 1, Jun. 1972, pp. 213–214.

*Primary Examiner*—William A. Powell

*Attorney, Agent, or Firm*—Karl F. Ross; Herbert Dubno

[57] ABSTRACT

In the process according to our invention authenticating (code) marks are provided on paper, particularly a security or other financial instrument, by contacting laser radiation from a laser light source on the paper to form the authenticating marks. The objects of our invention are attained with an apparatus equipped with a pivotable mirror device which allows the laser radiation to be directed on sheets of paper arranged transverse to the transport direction on a paper sheet. A preservative medium can be used to coat and protect the marks particularly from mechanical abrasion.

11 Claims, 2 Drawing Sheets

PROCESS AND APPARATUS FOR APPLYING AUTHENTICATING CODING TO VALUE-CARRYING PAPER

FIELD OF THE INVENTION

Our present invention relates to a method of and to an apparatus for applying authentication coding to value-carrying paper, such as securities, checks, banknotes and the like.

BACKGROUND OF THE INVENTION

Protection against counterfeiting of securities, particularly banknotes, is of substantial importance in commerce. The more an effort is made to produce securities which can not be counterfeited, the fewer will be attempts at counterfeiting and the more a trust in the securities or value-carrying paper will be generated. It is of course beneficial to the economy of the country making the securities to make such an effort.

A high degree of protection from counterfeiting is attained by making the cost of producing a counterfeit security so high that counterfeiting becomes unprofitable and/or the probability of legal interdiction of counterfeiting is high.

Because of recent developments in reproduction technology (color scanners, color copiers, automatic presses) sophisticated apparatus has been made available to an ever widening circle of personnel with which the components of an image of a code or authenticating mark can be imitated comparatively easily. Thus the degree of protection from counterfeiting presently depends more on the supporting material, particularly the paper used. To increase the degree of protection from counterfeiting, special paper particularly with watermarks, security strips and blended fibers can be used.

OBJECTS OF THE INVENTION

It is the principal object of our invention to provide an improved process and apparatus for making authenticating code marks on a security, particularly a banknote or check, which can further enhance protection against counterfeiting.

It is also an object of our invention to provide a process and apparatus for making authenticating code marks on a security which do not require special paper, e.g. with watermarks, security strips or blended fibers.

SUMMARY OF THE INVENTION

These objects and others which will become more readily apparent hereinafter are attained in accordance with our invention in a process and apparatus for making authenticating code marks on a security, so that special papers need not be used.

According to our invention our process for making authenticating code marks on a security such as a banknote, a piece of legal tender, check or the like comprises directing a pencil of laser radiation, hereinafter referred to as a laser beam, whose velocity and/or intensity is controllable against the value-carrying paper, i.e. the printed, unprinted paper or if desired a synthetic paper, to make at least one relief-like authenticating code mark or authentication coding by partial or complete removal of a color layer and/or by effecting structural changes in the fibers of the paper, and if desired preserving the relief-like authenticating coding made by the laser radiation in an additional preserving step.

In application in the process according to our invention an expansion in the paper preponderantly by vaporization of material, e.g. sizing, from the paper and thus fiber structural changes are caused. Because of this expansion an embossing or rise is formed in the paper surface which is of value for security purposes. By controlled deflection of the laser radiation any desired pattern can be generated. Also the intensity and the focus can be varied so that different widths and heights of the relief pattern can be generated.

It is particularly advantageous when the process of the invention is used together with a paper watermark. Particularly a cross of the relief lines arising by the laser action with the watermark affords especially effective protective value.

According to our invention counterfeiting attempts by scratching, stamping, scoring, impressing and the like can be very easily uncovered as gross imitations.

In the application of the preservative we may use lacquer, color or a hardenable plastic (synthetic resin) as the preservative material.

In order to detect attempts at erasures a fluorescent material can be incorporated in the preservative material.

In order to preserve the authenticating marks, we may also use processes other than coating, lacquering, printing or the like; however when such other processes are used, a partial coating is difficult and the thermal effect can be effective used only in a direct subsequent treatment after the laser irradiation of the value-carrying paper.

According to our invention the surface of the value-paper substrate, on which an ink or synthetic resin coating has been printed, preferably by a gravure process, can be quantitatively vaporized by the laser beam to make the authenticating mark, particularly one having a stepped and grid structure.

This kind of fine structure in a pattern useful for value-carrying paper purposes cannot be fabricated by the usual printing processes and is suitable for machine reading in banknote and check testing machines. For example a color step structure can be made whose level heights can be scanned in the direction of the optic axis and measured by coherent optical processes or an auto-focussing system comprising a microscope objective and translating stage.

By removal of pigment a relief structure can also be obtained whose significant appearance can be identified by persons for example by shadow effect or optical variations at different observation angles.

The laser beam can be applied in a single step with the production of the paper for the value-carrying paper, advantageously before calendering. By properly directing the laser beam a relief pattern is obtained. The use of the laser beam before calendering has the advantage that because of the comparatively slow sheet speed an optimum use of the laser system is attained and the subsequent calendering provides a surface strengthening of the paper fiber structure. It is also conceivable to use special energy absorbing material such as sizing material and filler material in the paper bulk in order to augment the expansion effect and/or to assist preservation of the pattern.

The authenticating code marks can also be applied to the paper concurrently with the printing process during the laser beam is directed onto the paper.

According to the process steps of our invention the laser beam can be refracted and/or deflected and the deflected and/or refracted laser beam can be directed onto paper zones spaced from each other transverse to the feed direction. The strip like paper zones extend in the feed direction on the paper sheet or web which is then printed in the strip zones to make the securities.

An apparatus which is suitable for performing the process of our invention can comprise a mirror device adjustable by a control mechanism for deflecting, refracting and/or positioning the laser beam to code zones of paper transverse to the paper running direction. For providing the authenticating mark, an apparatus which is the same in principle can find application in sheet and roll printing, but also with individual note feed.

A protective or preservative medium is directed onto the authenticating code marks made by the laser beam through a nozzle or nozzles controllable by a control or adjustable device. By these nozzles for example lacquer, color or hardenable plastic can be sprayed on and/or into the laser-produced relief lines to be absorbed by the fibers of the paper and also to be forced into the cavity in the paper. A fluorescent material can also be advantageously added.

It is also desirable if the control mechanism and the adjusting device are part of a single control unit common to both the laser-deflection and nozzle operating mechanisms. All that is required, therefore, is the installation of one control unit to operate both of these components.

BRIEF DESCRIPTION OF THE DRAWING

The above and other objects, features and advantages of our invention will become mor readily apparent from the following description, reference being made to the accompanying highly diagrammatic drawing in which.

SPECIFIC DESCRIPTION

Figure 1:
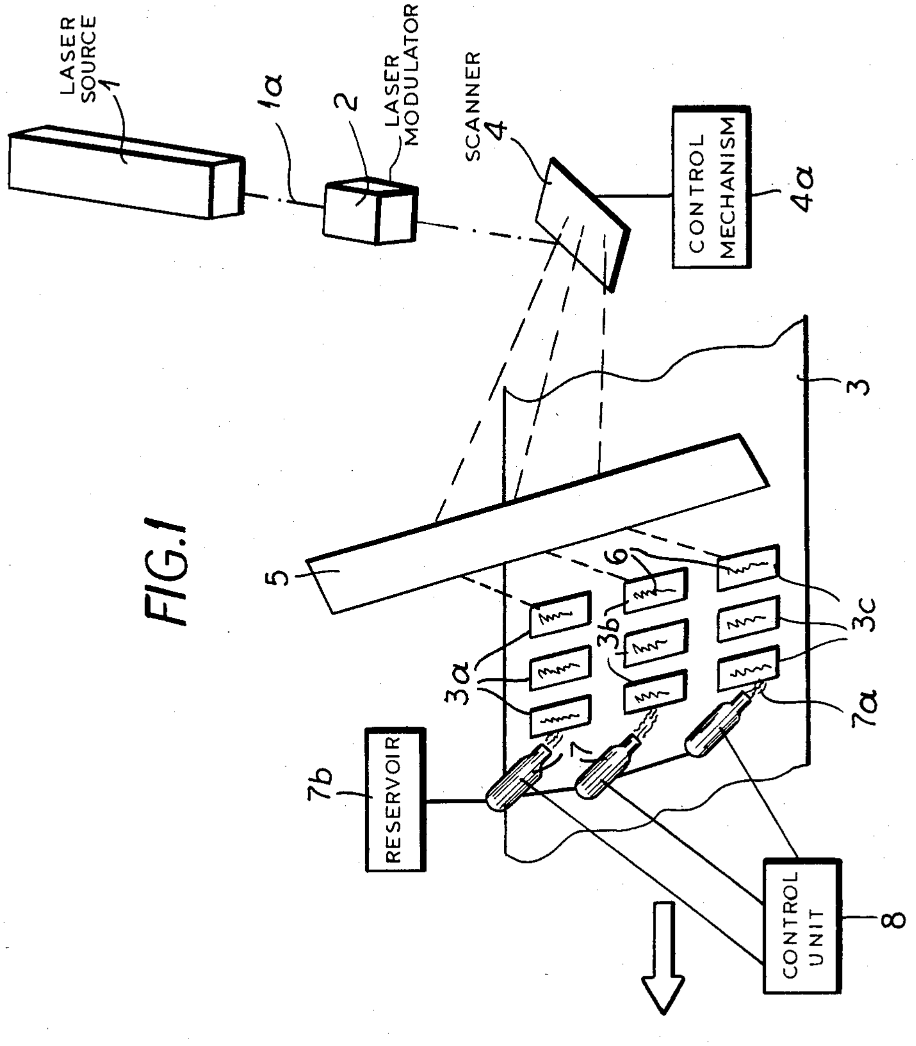
FIG. 1 is a schematic perspective view of an apparatus for making authenticating marks on a value-carrying paper according to our invention.

The drawing shows a laser light source 1. The laser beam or beam 1*a* from the laser light source 1 traverses an x-y optic-acoustic modulator 2. In it the laser beam or beam 1*a* is refracted or diffracted variably to make a pattern of authenticating code marks 6. A paper sheet or paper web 3 has paper strips or zones 3*a*, 3*b* and 3*c* are placed or printed on which the marks 6 are made.

There is a pivotable mirror 4 on which the laser beam or beam 1*a* from the laser light source 1 impinges which acts to direct the laser beam or beam 1*a* which forms the authenticating marks 6 on the different paper tracks 3*a*, 3*b* or 3*c*. In this embodiment an additional guide mirror 5 is used to assist in directing the laser beam or beam 1*a* to the appropriate paper strips or tracks 3*a*, 3*b* or 3*c*.

With a suitable paper feed, e.g. during paper fabrications or printing, the authenticating code marks 6 are made on the paper strips 3*a*, 3*b* or 3*c* one after the other transverse to the feed direction of the paper sheet or web 3. The paper strips 3*a*, 3*b* or 3*c* are printed and then cut to form banknotes, checks, or the like in the usual manner.

After the authenticating marks are made, a preservative medium 7*a* can be sprayed on them by a series of nozzles 7 positioned transverse to the feed direction of the paper strips 3*a*, 3*b* or 3*c*. The preservative medium can be supplied from a reservoir 7*b* and sprayed from the nozzles trained on the tracks 3*a*, 3*b* and 3*c*. An adjusting device 8 associated with the nozzles 7 can direct the preservative medium 7*a* to the authenticating marks 6.

A control mechanism 4*a* can be used to adjust the orientation of the mirror 4 to direct the laser beam 1*a* to different paper strips 3*a*, 3*b* or 3*c* which make up the securities on the paper sheet 3. Mirrors such as mirror 4 and mirror 5 and other light deflecting and defracting units and their associated control mechanism 4*a* by definition together make up a mirror device for deflection and positioning of the laser beam 1*a*.

Advantageously the control mechanism 4*a* and the adjusting device 8 can be the same control unit.

Figure 2A:
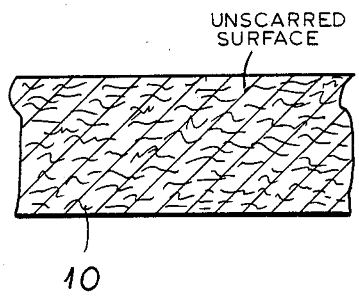
FIG. 2A is a diagrammatic section through the paper before subjecting it to the laser beam.
Figure 2B:
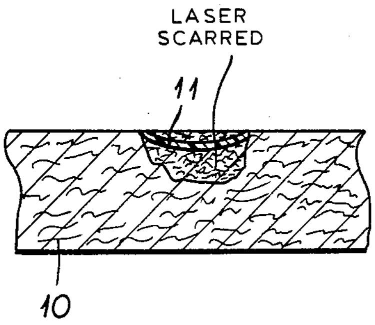
FIG. 2B is a section of the same region after laser encoding.
Figure 2C:
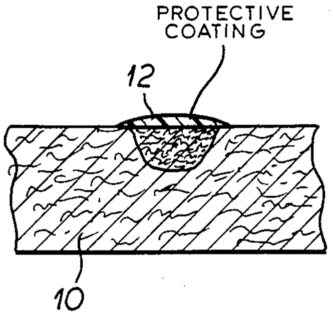
FIG. 2C is a section after the protective coating has been applied.

As can be seen in FIG. 2A, before laser coding, the fibers of the paper 10 are undisturbed. However, after laser coding in the zone 11 on which the beam was focused, there is an expansion and disruption of the fiber pattern to create a relief which is a function of the velocity or intensity modulation of the beam. This region is protected by the coating 12 (FIG. 2C).

We claim:

1. A process for applying authenticating coding to a value-carrying paper, comprising the steps of:

relatively displacing a value-carrying paper to be encoded and a laser beam; and directing said laser beam against said paper to be encoded with controllable intensity to form a relief on said paper by at least partially removing a color layer from said paper.

2. A process for applying authenticating coding to a value-carrying paper, comprising the steps of:

relatively displacing a value-carrying paper to be encoded and a laser beam; and directing said laser beam against said paper to be encoded with controllable velocity to form a relief on said paper by at least partially removing a color layer from said paper.

3. A process for applying authenticating coding to a value-carrying paper, comprising the steps of:

relatively displacing a value-carrying paper to be encoded and a laser beam; and directing said laser beam against said paper to be encoded with controllable velocity to form a relief on said paper by effecting a change in fiber structure of said paper.

4. A process for applying authenticating coding to a value-carrying paper, comprising the steps of:

relatively displacing a value-carrying paper to be encoded and a laser beam; and directing said laser beam against said paper to be encoded with controllable intensity to form a relief on said paper by effecting a change in fiber structure of said paper.

5. The process defined in claim 1, claim 2, claim 3 or claim 4, further comprising the step of preserving said relief formed by said laser beam on said paper by coating said relief on said paper.

6. The process defined in claim 5 wherein said relief is preserved by coating same with a coating protecting said relief against mechnaical abrasion.

7. The process defined in claim 1, claim 2, claim 3 or claim 4 wherein said laser beam is directed against said paper during production of said paper.

8. The process defined in claim 7 wherein said laser beam is directed against said paper before calendering thereof.

9. The process defined in claim 1, claim 2, claim 3 or claim 4 wherein said laser beam is directed against said paper during printing thereof.

10. The process defined in claim 1, claim 2, claim 3 or claim 4 wherein said laser beam is directed against said paper by deflecting it to respective strip zones of said paper transversely to a feed direction of said paper.

11. An apparatus for applying authenticating coding to a value-carrying paper, comprising:

a laser light source for generating a beam of laser radiation;

means for relatively displacing said beam and said value-carrying paper;

a mirror device for deflecting said beam and directing said beam against said value-carrying paper to form by action of the beam on the paper a laser-generated mark thereon constituting an authenticating code for the paper;

control means connected to said mirror device for controlling the action of the beam on said paper; and a plurality of nozzles following said mirror device and said source in a direction of feed of said paper and means for supplying said nozzles with a coating medium adapted to preserve said mark, thereby coating said paper over said mark with said medium.

* * * * *